United States Patent [19]

Ebel

[11] 3,734,794
[45] May 22, 1973

[54] HIGH-VOLTAGE CABLE AND METHOD OF MAKING

[75] Inventor: Lawrence Charles Ebel, Hastings-on-Hudson, N.Y.

[73] Assignee: Anaconda Wire and Cable Company, New York, N.Y.

[22] Filed: Nov. 23, 1970

[21] Appl. No.: 92,104

Related U.S. Application Data

[62] Division of Ser. No. 790,000, Jan. 9, 1969, Pat. No. 3,591,704.

[52] U.S. Cl. ................... 156/53, 156/56, 156/185, 156/190, 156/195
[51] Int. Cl. ................... H01b 13/08, H01b 13/26
[58] Field of Search ................... 156/53, 51, 56; 174/107–109, 102, 105, 106; 333/96

[56] References Cited
UNITED STATES PATENTS

| | | | |
|---|---|---|---|
| 2,446,387 | 8/1948 | Peterson | 174/102 C X |
| 2,988,467 | 6/1961 | Thevenon | 174/106 R X |
| 3,176,060 | 7/1965 | Priaroggia | 156/56 |
| 3,060,261 | 10/1962 | Stanley et al. | 174/106 R X |
| 3,259,684 | 7/1926 | Wakefield | 174/107 X |
| 3,484,679 | 12/1969 | Hodgeson et al. | 174/105 R X |

Primary Examiner—Alfred L. Leavitt
Assistant Examiner—David A. Simmons
Attorney—Victor F. Volk

[57] ABSTRACT

A high-voltage cable, with an insulating wall built up of dielectric tapes, has an electrically floating metal armor tape at mid-potential of the insulation. When the cable is manufactured it can be reeled up after the application of the armor and run through the taping machine a second time to apply the outer layers of insulating tape.

6 Claims, 2 Drawing Figures

Patented May 22, 1973

3,734,794

INVENTOR.
L.C. EBEL
BY
HIS AGENT

HIGH-VOLTAGE CABLE AND METHOD OF MAKING

CROSS REFERENCE TO RELATED APPLICATION

This application is a division of application Ser. No. 790,000, filed Jan. 9, 1969, now Pat. No. 3,591,704.

BACKGROUND OF THE INVENTION

In the manufacture of electric cables for use at very high voltages it is customary to apply the cable insulation in the form of paper or plastic tapes which will eventually be saturated with insulating oil. Many layers of tapes are required to be wrapped under carefully controlled tension and with precise spacing, and the machine for applying the tapes will have a hundred and more mounts for pads of tape which are rotated around a horizontally advancing cable conductor. The conductor must be advanced in a straight line during the taping operation and, in manufacturing practice, as the number of tapes has been increased with the increasing voltage requirements of modern cables, the floor space required for the taping machine has become excessive. Humidity and dust control of the area of the taping machine is necessary and this adds to the cost and complexity of tape-insulating equipment so that any reduction in length will represent a considerable saving in equipment costs.

The core leaving the taping machine is taken up on a cable reel and it has been suggested, as, for example by Thevenon in U.S. Pat. No. 2,988,467, to make more than one pass through the taping machine, building up the insulating wall in a plurality of operations and thus making use of a shorter taping machine. The means suggested by Thevenon for preventing damage to the core by the extra reeling and unreeling are, however, entirely inadequate in terms of the electrical stresses encountered by modern cables and the demand for absolute freedom from creasing or bunching of the tapes, which would occur when the core was unreeled for its second passage through the machine prior to impregnation.

From time to time it has been suggested, as in Volk Pat. No. 3,090,825, to apply one or more conducting layers within the insulation. Horn, in Pat. No. 2,854,500, has suggested that such a conducting layer should be impervious and should be over- and underlaid with semiconducting tapes. These prior art constructions are intended to provide a more uniform electrical stress distribution within the cable insulation. Where the conducting layer is impervious, however, it interferes with the cable impregnation. In no case are the prior art conducting layers substantially enough to equalize the temperature as well as the voltage distribution in the insulation.

SUMMARY OF THE INVENTION

I have invented a high-voltage cable comprising a conductor, a plurality of layers of insulating tape helically wrapped around the conductor to form an inner core, and a layer of electricity- and heat-conducting armor tape helically wrapped around the core. An additional plurality of layers of insulating tape are helically wrapped over the armor tape and a shielding layer is applied over all. Preferably, cable comprises layers of semiconducting tape helically applied over and under the armor tape which, preferably, has a potential half that of the conductor when the cable is energized. My cable can comprise a plurality of layers of armor tapes spaced at equipotential steps between the conductor and the outer shielding.

In the method of manufacturing my cable the length of the required taping machine can be reduced by reeling the cable core directly after it has been armored and paying the armored core from the reel into the same or similar taping machine. Thus my method will comprise the steps of passing a conductor horizontally through a plurality of insulating-tape winding heads, thereby building a multilayered wall of insulation around the conductor to form an inner core, passing the inner core through an armor taping head and therein applying a layer of electricity- and heat-conducting protective armor tapes. I then take up the armored inner core on a cable reel, pass it horizontally from the reel through a plurality of insulating-tape winding heads, which may be the original heads, thereby building up a second multilayered wall of insulation over the armor to form a composite cable core. Then I apply a layer of shielding over the composite core and take up the shielded core on a cable reel. In preferred embodiments of my method semiconducting tapes are applied over and under the armor tape and the shielded core is immersed in insulating oil to saturate the layers of insulating tape both over and under the armor tape.

By means of my invention I have provided a cable of higher dielectric strength and temperature uniformity.

By means of my invention I have provided a cable with great structural strength and stability.

By means of my invention I have provided a reduction in the length of taping machine required for a given cable insulation thickness.

DETAILED DESCRIPTION OF A PREFERRED EMBODIMENT

Figure 1:
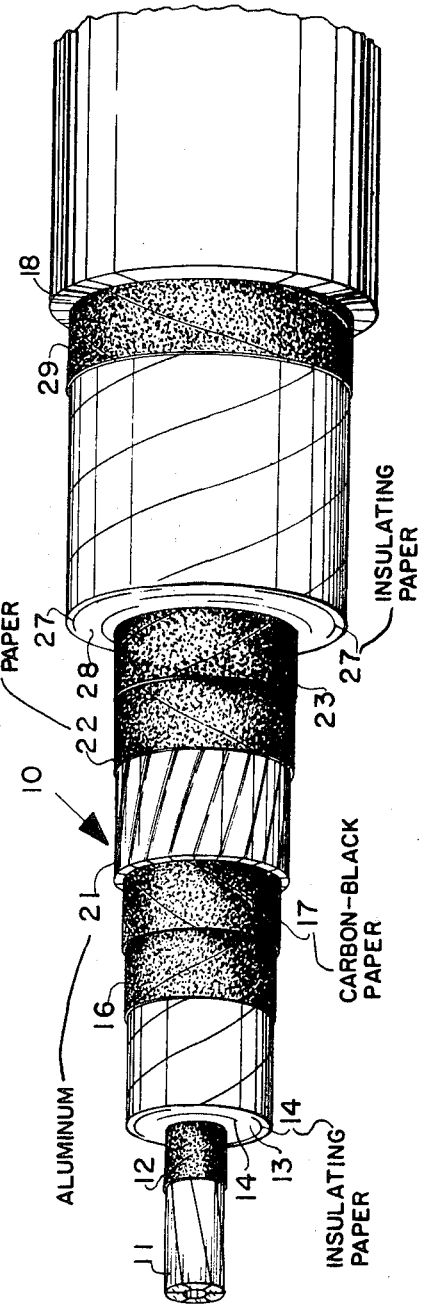
FIG. 1 shows a pictorial view of a cable made to my invention.

Referring to FIG. 1 a cable indicated generally by a numeral 10 comprises a hollow conductor 11 of copper or aluminum, a semiconducting strand shielding 12 comprised, as is usual, of a wrapping of carbon-black paper tape, and a wall 13 built up of a plurality of layers 14-14 of dielectric tapes, helically applied. The illustrated layers 14 of the cable 10 are paper but it is also known to employ plastic tapes such as polyethylene, polyester, polycarbonate, polypropylene, polyphenylene-oxide, and polysulfone and my invention includes plastic tapes within its scope. Indeed, because of the structural instability of plastic tape cables compared to paper cables my invention has particular utility for such plastic tape cables in that, as shall be shown, it provides a strengthening member in the structure of the insulation wall.

Over the wall 13 there are applied semiconducting layers 16, 17 formed from helically applied carbon-black paper tapes. Over the layer 17 I have applied a plurality of armor tapes 21 with a pitch or lay-length exceeding the lay length of the other tapes in my cable structure. For the tapes 21 I prefer copper, bronze, aluminum, or aluminum alloy of which many suitable types are known that combine good electrical and thermal conductivity with high tensile strength. So long, however, as the tapes 21 are not magnetic they can be selected from a wide range of metals within the scope of my invention. It is important to my invention that the tapes 21 should have sufficient thickness to provide the necessary structural rigidity and heat conductivity and, in general, the armor tapes 21 will considerably exceed in thickness, the thickness of the layers 14. The tapes 21 are applied close to each other, but because of their thickness and relative stiffness, compared to paper and-/or plastic films, they do not form a fluid-tight barrier and oil will flow between the adjacent tapes when the cable core is impregnated.

Over the tapes 21 I have applied conventional carbon-black paper tape layers 22, 23 and over this a large plurality of layers 27-27 of insulating paper to form a wall 28 having a thickness such that, when the cable is energized, the conducting layers 16, 17, 21, 22, 23 which are equipotential, will have a voltage approximately half the difference between the conductor 11 and the outside surface of the wall 28. This will also approximate the temperature midpoint of the section through the cable insulation, calculation of which can be done by well-known mathematical principles, that will result in a wall thickness 28 greater than the wall thickness 13 which is in keeping with the established knowledge that the electrical stress on the insulation is greater at points in the section closer to the conductor. A layer 29 of semiconducting carbon-black paper is applied over the insulation layer 28 in the usual manner and the cable is completed by an extruded lead sheath 18.

EXAMPLE

A 2500 Mcm (thousand circular mil) 550 kv pipe type cable core with an insulating wall under the armor tapes having a thickness of about 0.62 inch and an insulating wall over the armor tapes having a thickness of about 0.86 inches is made up by winding 30 layers of 4-mil paper; 48 layers of 5-mil paper and 40 layers of 6-mil paper over the conductor strand shielding and 40 layers of 8-mil followed by 50 layers of 10½-mil paper over the armor and its carbon-black paper. The armor itself is made up of 43 aluminum strips 40 mils thick and 200 mils wide. Two layers of carbon-black tape are applied under and two layers over the armor.

My novel cable structure has the essential feature of a layer of armor tapes within the insulation wall and this feature can be applied to high-voltage cables of different known types such as oil-filled cables, solid-type cables, and pipe-type cables and the conductor 11 may be also solid or sector shaped within the scope of my invention.

Figure 2:
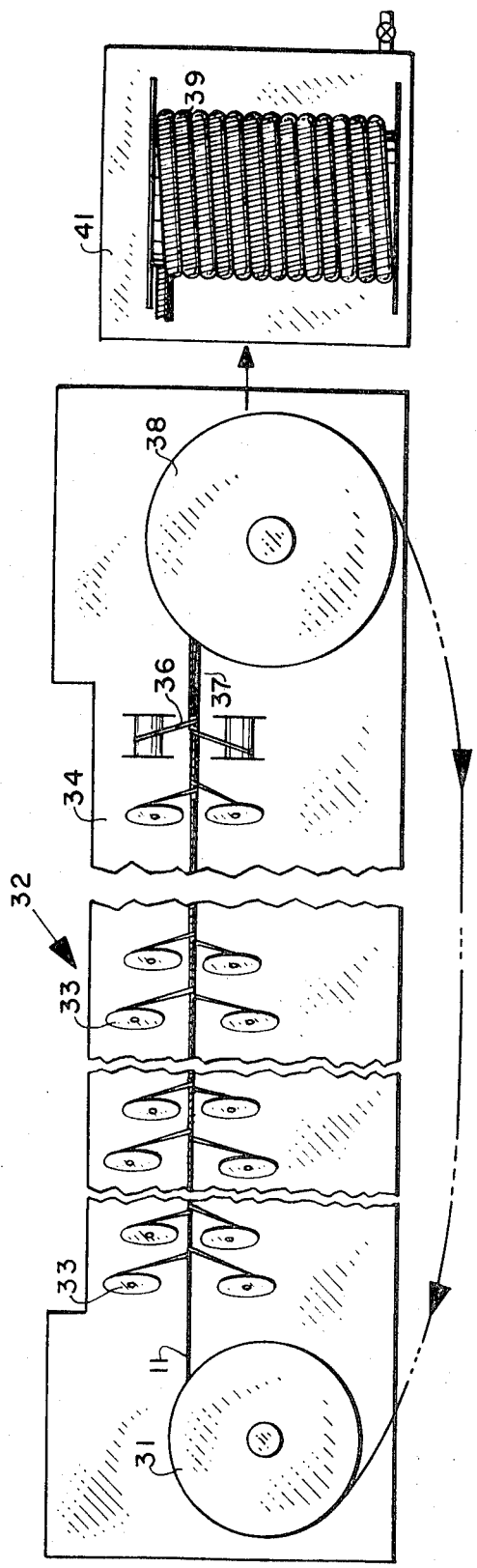
FIG. 2 illustrates the steps in the method of my invention.

In the manufacture of my cable it is advantageous to use my novel method exemplified in FIG. 2 where the conductor 11 is being paid from a reel 31 through a long taping machine indicated generally by the numeral 32. The machine 32 comprises a large plurality of taping heads 33-33 for applying paper tape, all enclosed in a chamber 34 so as to keep the humidity under control and exclude dust. Within the chamber 34 a final taping apparatus 36 applies the armor tape 21 whereafter the cable core, designated by the numeral 37 is taken up on a reel 38 which, preferably, is also maintained under controlled humidity. Thereafter the reel 31 is replaced by the reel 38 and the core 37 is passed through the machine 32. This is possible because the armor tapes 21, due to their strength and rigidity, support and protect the insulating wall 13 and keep the layers 14 from wrinkling or crimping. In the absence of the armor 21, however, the demands for perfectly smooth tapes in high voltage cables would preclude any extra handling of the core 37 prior to impregnation. For the second passage the tapes in the taping heads 33 are replaced with paper tapes having a greater thickness so that a correspondingly thicker layer of insulation is built up over the armor. In this second passage through the machine 32 the head 36 is not operated but an outer layer of shielding tape is applied in a known manner and the cable core taken up on a reel 39 similar to the reel 38. Thereafter the reel 39 is placed in an evacuating and impregnating chamber 41 in the usual manner. The illustrated impregnation of the cable core on the reel 39 follows standard practice for pipe-type cables but my method has application also for cables where a sheath is extruded over the core prior to impregnation. In this case the core will be paid from the reel 39 into a sheath extrusion machine, or even paid into such an extrusion machine directly from the taping machine 32 prior to final reeling, within the scope of my invention.

I have invented a new and useful electrical cable and method of which the foregoing description has been exemplary rather than definitive and for which I desire an award of Letters Patent as defined in the following claims.

I claim:

1. The method of manufacturing a high-voltage cable comprising the steps of:
   A. passing a conductor horizontally through a plurality of insulating-tape winding heads, thereby building a multilayered wall of insulation around said conductor to form an inner core,
   B. passing said inner core through an armor taping head and therein applying a layer of electricity- and heat-conducting protective armor tape,
   C. taking-up the armored inner core on a cable reel,
   D. passing said armored inner core horizontally from said reel through a plurality of insulating-tape winding heads, thereby building up a second multilayered wall of insulation over said armor, to form a composite cable core,
   E. applying a layer of shielding over said composite core, and
   F. taking up the shielded core on a cable reel.

2. The method of claim 1 wherein a plurality of the same tape winding heads applies the insulation over said conductor and over said armored core.

3. The method of claim 1 comprising the step of immersing said shielded core in insulating oil and thereby saturating the layers of insulating tape both over and under said armor tape.

4. The method of claim 1 comprising the steps of applying semiconducting tapes under and over said armor tape, in electrical communication therewith.

5. The method of claim 2 comprising the steps of applying semiconducting tapes under and over aid armor tape, in electrical communication therewith.

6. The method of claim 3 comprising the steps of applying semiconducting tapes under and over said armor tape, in electrical communication therewith.

* * * * *